United States Patent
Morvan et al.

(10) Patent No.: US 9,903,188 B2
(45) Date of Patent: Feb. 27, 2018

(54) ALKYL POLYGLUCOSIDE DESORBENTS FOR ENHANCED OIL RECOVERY

(71) Applicants: RHODIA OPERATIONS, Paris (FR); IFP Energies Nouvelles, Rueil-Malmaison (FR)

(72) Inventors: Mikel Morvan, Pessac (FR); Patrick Moreau, Pessac (FR); René Tabary, Saint Germain en Laye (FR); Brigitte Bazin, Rueil-Malmaison (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 15/185,224

(22) Filed: Jun. 17, 2016

(65) Prior Publication Data
US 2016/0369159 A1    Dec. 22, 2016

(51) Int. Cl.
*E21B 43/20* (2006.01)
*C09K 8/584* (2006.01)
*C09K 8/588* (2006.01)

(52) U.S. Cl.
CPC ............. *E21B 43/20* (2013.01); *C09K 8/584* (2013.01); *C09K 8/588* (2013.01)

(58) Field of Classification Search
CPC ...................................................... C09K 8/954
See application file for complete search history.

(56) References Cited

U.S. PATENT DOCUMENTS

2009/0194278 A1* 8/2009 De Francesco ........ C09K 8/594
166/261

OTHER PUBLICATIONS

Pemberton et al.; Trace Fossils from the Athabasca Oil Sands, Alberta, Canada; Aug. 27, 1982; American Association for the Advancement of Science Stable; vol. 217; pp. 825-827.*

* cited by examiner

*Primary Examiner* — Anuradha Ahuja

(57) ABSTRACT

The inhibition of anionic surfactant retention phenomena in an oil reservoir, especially in a carbonate-based or argillaceous reservoir, by the use of at least one compound corresponding to the formula R—O-(A)m-H, in which R is a hydrocarbon-based group comprising from 6 to 40 carbon atoms, A is a hexose or pentose unit, and m is a non-zero number ranging from 1 to 10, is described herein.

13 Claims, No Drawings

ALKYL POLYGLUCOSIDE DESORBENTS FOR ENHANCED OIL RECOVERY

CROSS-REFERENCE TO RELATED APPLICATIONS

This application claims the priority of French Patent Application No. 15 01274, filed Jun. 18, 2015, the entire contents of which is hereby incorporated by this reference.

BACKGROUND OF THE INVENTION

The present invention relates to the field of the enhanced recovery of crude oil from underground formations, and more particularly to the problems of retention of surfactants in these underground formations during steps of enhanced oil recovery.

During the extraction of oil from a hydrocarbon reservoir (oil-yielding reservoir such as a consolidated or non-consolidated rock formation, or a sand, for example), according to a first step known as "primary recovery", the oil is entrained out of a production well by the excess pressure naturally prevailing in the reservoir. This primary recovery gives access to only a small amount of the oil contained in the reservoir, typically at the very most about 10% to 15%.

In order to enable the extraction of the oil to continue after this primary recovery, secondary production methods are employed, when the pressure in the reservoir becomes insufficient to displace the oil that is still in place. Typically, a fluid is injected (reinjection of the diluted or undiluted water produced, injection of sea or river water, or alternatively injection of gas, for example) into the hydrocarbon reservoir, in order to exert in the reservoir an excess pressure capable of entraining the oil toward the production well(s). A usual technique in this context is injection of water (also known as inundation or waterflooding), in which large volumes of water are injected under pressure into the reservoir via injection wells. The injected water entrains part of the oil that it encounters and pushes it toward one or more production wells. However, secondary production methods such as waterflooding make it possible to extract only a relatively small part of the hydrocarbons in place (typically about 30%). This partial flushing is due especially to the trapping of the oil by the capillary forces, to the differences in viscosity and density existing between the injected fluid and the hydrocarbons in place, and also to heterogeneities at microscopic or macroscopic scales (at the scale of the pores and also at the scale of the reservoir).

To attempt to recover the rest of the oil which remains in the underground formations after the use of the primary and secondary production methods, various techniques have been proposed, which are known as Enhanced Oil Recovery. Among these techniques, mention may be made of techniques similar to the abovementioned waterflooding (inundation), but using a water comprising additives, for instance water-soluble surfactants (this is then typically referred to as surfactant flooding). The use of such surfactants especially induces a decrease in the water/oil interface tension, which is capable of ensuring more efficient entrainment of the oil trapped in the pore constrictions.

The surfactants usually recommended in this context are typically anionic surfactants, especially of sulfate or sulfonate type. Although they do indeed prove to be effective in lowering the water/oil interface tension, these anionic surfactants have a drawback, which is that they tend to remain trapped in the underground formations, typically taking into account chemical absorption phenomena at the surface of the rocks, which appreciably affects the recovery efficacy and/or the process costs.

Among other things, the surfactants thus immobilized in the reservoir can no longer participate in the mobilization and extraction of the oil, and the extraction efficacy is consequently affected. Strong adsorption may be compensated for by the use of high concentrations of surfactants, but with repercussions in terms of costs. More generally, the surfactant adsorption phenomena have a negative impact on the extraction costs.

The adsorption phenomena of the abovementioned anionic surfactants are most particularly pronounced:
- when the surfactants are used in a water with high contents of salt and/or of divalent cations (especially seawater); and
- in certain rock formations, such as carbonates or clay rocks such as argillaceous sandstones (in which the adsorption is high, even if waters with high contents of salt and/or of divalent ions are avoided).

To inhibit the surfactant adsorption phenomena, various solutions have been proposed, which are more or less effective and which are generally limited to specific conditions of use.

Thus, in particular, it has been proposed to use sacrificial agents, which are supposed to have greater affinity for the rock than the surfactant species employed for the enhanced oil recovery. In this context, the possible use of lignosulfonates or of poly(ethylene oxides) of low molecular mass, whose efficacy is variable, especially depending on the nature of the surfactants, of the rock and of the salinity conditions, has been disclosed.

More recently, the use of ethoxylated nonionic surfactants, such as Rhodasurf® LA 12 available from the company Solvay, which make it possible to effectively overcome the harmful effects of the retention of anionic surfactants in oil reservoirs, has been proposed, especially in application FR 2 986 008.

SUMMARY OF THE INVENTION

One aim of the present invention is to provide an even more efficient means for limiting or even overcoming the harmful effects of the retention of anionic surfactants, especially of sulfate and/or sulfonate type, in oil reservoirs during steps of enhanced oil recovery, most particularly in oil-yielding rocks of carbonate or argillaceous rock type.

To this end, it is proposed according to the present invention to use alkyl polyglucosides which prove to be even more efficient, especially in difficult temperature and salinity conditions.

More specifically, the present invention proposes the use of at least one compound of formula below:

$$R-O-(A)_m-H \tag{I}$$

in which:
- R is a hydrocarbon-based group comprising from 6 to 40, for example from 8 to 24, carbon atoms,
- A is a hexose or pentose unit,
- m (which corresponds to the number of A units) is a non-zero integer or fraction ranging from 1 to 10, for inhibiting the anionic-surfactant retention phenomena in an oil reservoir (the notion of "anionic surfactants" when this expression is used in the plural form in the present description and in the claims refers to a population of at least one anionic surfactant, namely either several anionic surfactants of one and the same type, or a mixture of several types of anionic surfactants).

Preferably, a compound of formula (I) that is useful according to the invention has an HLB (hydrophilic-lipophilic balance) of less than 14 and typically greater than 10, for example between 11 and 14.

DETAILED DESCRIPTION

The studies performed by the inventors in the context of the present invention have made it possible to reveal that the abovementioned compounds of formula (I), and especially those having an HLB less than 14, are water-soluble agents that have the particularly advantageous property of desorbing anionic surfactants when they are injected in aqueous solution into rocks (oil reservoirs) into which these anionic surfactants have previously been adsorbed. In this sense, the compounds of formula (I) may be termed anionic-surfactant desorbents.

The compounds of formula (I) make it possible in particular to desorb in a particularly efficient manner anionic surfactants of sulfate and/or sulfonate type from oil-yielding rocks, especially mixtures of primary surfactants of olefin sulfonate or alkylarylsulfonate type and secondary surfactants of alkyl ether sulfate or alkyl ether glyceryl sulfonate type.

More generally, the compounds of formula (I) can desorb the majority of the anionic surfactants used for enhanced oil recovery, especially anionic surfactants of carboxylate, phosphate and/or phosphonate type.

For the purposes of the present invention, the notion of anionic surfactant encompasses all surfactants bearing at least one anionic group under the conditions of the extraction performed. Thus, an anionic surfactant encompasses not only the abovementioned sulfates and sulfonates, but also other types of surfactants, including surfactants of zwitterionic nature. The compounds of formula (I) are particularly suited to the desorption of purely anionic surfactants (namely surfactants not bearing positive charges). However, according to a specific embodiment, the compounds of formula (I) may optionally be used for desorbing compounds of zwitterionic nature (alone or mixed with purely anionic surfactants).

The compounds of formula (I) may moreover inhibit the retention effect of anionic surfactants, especially of the abovementioned type, when they are introduced in combination with said anionic surfactants. Accordingly, they may also be considered as anionic-surfactant anti-retention agents in oil-yielding rocks (oil reservoirs). In this context, the compounds of formula (I) may be used in particular for avoiding the retention of anionic surfactants, when they are used in the form of an extraction liquid and/or when they are in the form of a foam (obtained by injecting the anionic surfactant and the compound of formula (I) in aqueous medium into the oil-yielding rock followed by injecting a gas, typically according to the "WAG" process). The compounds of formula (I) are especially capable of improving the effect of the foam, by avoiding retention phenomena in the rock.

Moreover, when they are introduced into oil-yielding rocks (oil reservoirs) prior to the injection of anionic surfactants, especially of the abovementioned type, the compounds of formula (I) make it possible to prevent the anionic-surfactant retention effect, by limiting the amount of anionic surfactants that become adsorbed onto the rock. Accordingly, the compounds of formula (I) may also be described as sacrificial agents.

It furthermore turns out that these various properties are obtained both at low contents of salts and of divalent cations and at a high content of these salts or cations (especially by using seawater as solvent for the surfactants), this also being achieved in rocks of carbonate or argillaceous sandstone type.

Furthermore, the effects observed in the context of the present invention do not involve high concentrations of compound of formula (I). Typically, in the context of the present invention, the compounds of formula (I) may be used—alone or in the form of a mixture of several nonionic surfactants of formula (I)—in aqueous fluids comprising these compounds at a concentration that does not need to exceed 5 g/L, and which may be, for example, between 0.1 and 4 g/L, preferably between 0.5 and 2 g/L.

Besides the abovementioned advantages, the compounds of formula (I) that are useful according to the invention may, at least in certain cases, improve the water solubility of anionic surfactants, especially of sulfate or sulfonate type. The compounds of formula (I) make it possible in this respect to improve the injectivity of certain anionic surfactants, especially mixtures of primary surfactants of olefin sulfonate or alkylarylsulfonate type and secondary surfactants of alkyl ether sulfate or sulfonate type, when they are added in combination with these surfactants.

Furthermore, the use of the compounds of formula (I), which are nonionic surfactants, is of a nature to be able to improve the compatibility of the anionic surfactants, especially of sulfonate type, with other compounds that are used in EOR, for instance viscosity-enhancing polymers such as partially hydrolyzed polyacrylamides, for example, which constitutes yet another advantage of the compounds of formula (I).

According to an advantageous embodiment, the compounds of formula (I) are used in combination with at least one viscosity-enhancing polymer. According to this embodiment, the inhibiting effect on the anionic-surfactant retention or desorption phenomena generally proves to be most particularly advantageous.

Usually, an improved effect is observed in the presence of the additional polymer, or even a synergistic effect in certain cases (the inhibiting effect on the retention of the surfactants onto the rock is generally greater than the simple addition of the effect observed in the presence of a compound (I) without polymer and of the effect observed in the presence of the polymer without the compound of formula (I)). Such a synergistic effect is, for example, observed especially for the surfactants or formulations of sulfate or sulfonate type, by using additional polymers that are chosen from polyacrylamides, which are preferably partially hydrolyzed.

The compounds of formula (I) may especially be used in combination with viscosity-enhancing polymers chosen from:

hydrophilic polymers including homopolymers, copolymers or terpolymers, for instance polymers of modified or unmodified alkyl acrylate type, optionally bearing substituents such as 2-acrylamido-2-methylpropanesulfonic acid, N,N-dimethylacrylamide, vinylpyrrolidone, dimethylaminoethyl methacrylate, acrylic acid, vinyl acetate, vinylsulfonic acid or methacrylic acid groups.

biopolymers such as guars or xanthan gum, for example.

In the compounds of formula (I), the group —R is a linear or branched, saturated or unsaturated, totally or partially cyclized hydrocarbon-based group. Although the presence of heteroatoms (N, P or halogens) is not excluded, in absolute terms, on this group R, it is usually a group which comprises only hydrogen and carbon atoms. The group —R preferably comprises at least 6 carbon atoms, more preferentially at least 10 carbon atoms. This number of carbon atoms moreover preferably remains less than or equal to 30, preferentially less than or equal to 20.

According to an advantageous embodiment, the group —R is a hydrocarbon-based group of the abovementioned type comprising about 12 carbon atoms. This group —R is linear or branched, and generally non-cyclic, although it may, in certain embodiments, optionally be totally or partially cyclized.

The group —R is preferably a hydrocarbon-based group comprising only hydrogen and carbon atoms, chosen, for example, from alkyls, aryls, arylalkyls and alkylaryls. It may thus typically be a linear or branched alkyl or alkenyl group, then preferably comprising from 6 to 18 carbon atoms, more advantageously from 10 to 16 carbon atoms. As groups R that are particularly suited to the implementation of the invention, mention may be made especially of linear hexyl, heptyl, octyl, nonyl, decyl, undecyl, dodecyl, tridecyl, tetradecyl and pentadecyl alkyl groups, and 2-ethylhexyl groups.

According to a particular embodiment, the group —R is a dodecyl group—$(CH_2)_{11}$—$(CH_3)$.

The compounds of formula (I) used in the context of the present invention preferably comprise, as group R, a $C_{10}$ to $C_{18}$ alkyl group, for example a linear $C_{10}$ to $C_{15}$ alkyl group.

In the compounds of formula (I), each of the units A may be chosen from:
hexose units such as allose, altrose, glucose, mannose, gulose, idose, galactose or talose,
pentose units such as ribose, arabinose, xylose or lyxose (I).

Moreover, in the compounds of formula (I), m is preferably less than or equal to 7, and more preferentially less than or equal to 5.

Thus, m may especially be equal to 1, 2, 3 or 4.

Irrespective of the value of m, each of the m groups A, which may be identical or different, is preferably a glucose or xylose radical. More preferentially, it is a glucose radical.

In certain cases, use may be made of a mixture of several compounds of formula (I). In this case, each of the compounds is characterized by an integer value of m in the abovementioned ranges and a mean value of $m_n$ that is potentially non-integer may be defined for all of the compounds.

The compounds (I) that are useful according to the invention may be prepared according to any process that is known per se, and especially via reactions catalyzed with acids, in which alcohols ROH are reacted with sugars, removing the water of formation, for instance the reaction described in U.S. Pat. Nos. 3,547,828 or 5,898,070.

Compounds of formula (I) that are advantageous according to the present invention are especially the alkylpolyglucosides available from the company SEPPIC under the name Simulsol®, and in particular the Simulsol® products with an HLB of between 11 and 14, for instance Simulsol® SL8, SL10, SL11W or SL55.

Preferably, the abovementioned compounds of formula (I) are used for inhibiting the retention phenomena of anionic surfactants chosen from:
anionic agents of sulfonate and/or sulfate type;
mixtures of anionic surfactants comprising one or more anionic agents of sulfonate and/or sulfate type, these mixtures preferably not comprising nonionic surfactants.

Preferably, the compounds of formula (I) are used as anionic-surfactant desorbents.

According to a more specific aspect, a subject of the present invention is processes of enhanced oil recovery from an underground formation, which exploit at least one of the abovementioned uses of the compounds of formula (I), the compound of formula (I) preferably at least being used as desorbent.

Thus, according to a first, particularly advantageous embodiment, a subject of the present invention is especially a process of enhanced oil recovery from an underground formation, in which:
a fluid comprising at least an aqueous medium, an anionic surfactant and optionally at least one additional anionic surfactant, called "anionic cosurfactant" (this fluid typically being free of nonionic surfactant and optionally being able to comprise a polymer, for example a partially hydrolyzed polyamide) is injected into said underground formation, via at least one injection well; and then
a fluid comprising a compound of formula (I) of the abovementioned type is subsequently injected via the same injection well(s); and
a fluid conveying the oil leaving the underground formation is recovered by at least one production means.

According to another embodiment which is optionally compatible with the preceding embodiment, a subject of the present invention is a process of enhanced oil recovery from an underground formation, in which:
a fluid comprising at least an aqueous medium, a compound of formula (I) of the abovementioned type, an anionic surfactant and optionally an anionic cosurfactant (this fluid typically being free of nonionic surfactant other than the compound (I) and optionally being able to comprise a polymer, for example a partially hydrolyzed polyamide) is injected into said underground formation, via at least one injection well; and then
a fluid conveying the oil leaving the underground formation is recovered by at least one production means.

According to yet another advantageous embodiment, optionally compatible with one of the other preceding modes and/or the other, a subject of the present invention is a process of enhanced oil recovery from an underground formation, in which:
a fluid comprising a compound of formula (I) of the abovementioned type is injected into said underground formation, via at least one injection well; and then
a fluid comprising at least an aqueous medium, an anionic surfactant and optionally an anionic cosurfactant (this fluid typically being free of nonionic surfactant and optionally being able to comprise a polymer, for example a partially hydrolyzed polyamide) is introduced; and then
a fluid conveying the oil leaving the underground formation is recovered by at least one production means.

The different variants of the processes of the invention may be advantageously used for the enhanced recovery of oil in underground formations which are consolidated or non-consolidated, carbonate-based or argillaceous (especially argillaceous sandstone) rocks. Be that as it may, the invention shall not be limited solely to such reservoirs.

The example below illustrates a nonlimiting embodiment of the invention and advantages relating to the compounds of formula (I).

EXAMPLE

This example illustrates the effect of compounds of formula (I) on the inhibition of the adsorption of an anionic surfactant formulation (50/50 by mass mixture of sodium olefin sulfonate and of sodium alkyl ether sulfate).

The anionic surfactant formulation used in this example was prepared in seawater from the North Sea (salinity 35.16).

The adsorption was measured via a standard method on milled rock (sandstone from Clashach), in reference to the specific surface area of the rock, determined by the BET method with krypton.

The results obtained are reported in the table below, in which the adsorption is expressed in mg of anionic surfactants per square metre of rock surface.

TABLE

| Agent added (2 g/l) | Seawater 20° C. | Seawater 80° C. |
|---|---|---|
| Control: no agent added | 5 | |
| Simulsol ® SL8 (HLB = 13.8) | 2.8 | |
| Simulsol ® SL10 (HLB = 12.6) | 2 | 3.1 |
| Simulsol ® SL11W (HLB = 12.4) | 3.3 | |
| Simulsol ® SL55 (HLB = 12.1) | 3 | |

Additional Embodiments

Embodiment 1. The use of at least one compound of formula (I) below:

R—O-(A)$_m$-H     (I)

in which:
R is a hydrocarbon-based group comprising from 6 to 40, for example from 8 to 24, carbon atoms,
A is a hexose or pentose unit,
m is a non-zero integer or fraction ranging from 1 to 10;
for inhibiting the anionic-surfactant retention phenomena in an oil reservoir.

Embodiment 2. The use as described in embodiment 1, in which the compound of formula (I) has an HLB less than 14.

Embodiment 3. The use as described in embodiment 1 or 2, in which the nonionic surfactant of formula (I) is used for desorbing the at least one anionic surfactants trapped beforehand in the reservoir, the nonionic surfactant of formula (I) being injected in aqueous solution into an oil reservoir into which said anionic surfactants have been adsorbed beforehand.

Embodiment 4. The use as described in embodiment 3, in which the anionic surfactants are:
anionic agents of sulfonate and/or sulfate type;
mixtures of anionic surfactants comprising one or more anionic agents of sulfonate and/or sulfate type, these mixtures preferably not comprising nonionic surfactants.

Embodiment 5. The use as described in embodiment 3, in which the anionic surfactants are surfactants of carboxylate, phosphate and/or phosphonate type, or surfactants of zwitterionic nature.

Embodiment 6. The use as described in embodiment 1 or 2, in which the nonionic surfactant of formula (I) is introduced in combination with said anionic surfactants, and is used as an anionic-surfactant anti-retention agent in the oil reservoir.

Embodiment 7. The use as described in embodiment 1 or 2, in which the nonionic surfactant of formula (I) is introduced into the reservoir prior to the injection of anionic surfactants, as a sacrificial agent, i.e. for preventing the anionic-surfactant retention effect, by limiting the amount of anionic surfactants that become adsorbed.

Embodiment 8. The use as described in one of embodiments 1 to 7, in which the nonionic surfactant of formula (I) is used in combination with at least one viscosity-enhancing polymer, for example a partially hydrolyzed polyacrylamide.

Embodiment 9. The use as described in one of embodiment 1 to 8, in which the group —R present on the nonionic surfactant of formula (I) is a linear or branched alkyl or alkenyl group, preferably comprising from 6 to 18 carbon atoms, more advantageously from 10 to 16 carbon atoms, R preferably being an alkyl group.

Embodiment 10. A process of enhanced oil recovery from an underground formation involving the use as described in embodiment 1, in which:
a fluid comprising at least an aqueous medium, an anionic surfactant and optionally an anionic cosurfactant is injected into said underground formation, via at least one injection well; and then
a fluid comprising a compound of formula (I) as defined in embodiment 1 is subsequently injected via the same injection well(s); and
a fluid conveying the oil leaving the underground formation is recovered by at least one production means.

Embodiment 11. A process of enhanced oil recovery from an underground formation involving the use as described in embodiment 1, in which:
a fluid comprising at least an aqueous medium, an anionic surfactant and optionally an anionic cosurfactant, this fluid preferably being free of nonionic surfactant, and a compound of formula (I) as defined in embodiment 1 is injected into said underground formation, via at least one injection well; and then
a fluid conveying the oil leaving the underground formation is recovered by at least one production means.

Embodiment 12. A process of enhanced oil recovery from an underground formation involving the use as described in embodiment 1, in which:
a fluid comprising a compound of formula (I) as defined in embodiment 1 is injected into said underground formation, via at least one injection well; and then
a fluid comprising at least an aqueous medium, an anionic surfactant and optionally an anionic cosurfactant is introduced; and then
a fluid conveying the oil leaving the underground formation is recovered by at least one production means.

Embodiment 13. The process as described in one of embodiments 10 to 12, in which the underground formation is a carbonate-based or argillaceous rock.

What is claimed is:
1. A process for enhanced oil recovery from an underground formation, wherein retention of an anionic surfactant in the underground formation is inhibited by a compound of formula (I), the process comprising:
injecting a fluid comprising an aqueous medium, the anionic surfactant and optionally an anionic cosurfactant into said underground formation, via at least one injection well; and then
injecting a fluid comprising the compound of formula (I) acting as a desorbent for the anionic surfactant via the at least one injection well; and
recovering a fluid conveying the oil leaving the underground formation by at least one production means;
or injecting a fluid comprising the compound of formula (I), acting as sacrificial agent for the anionic surfactant, into said underground formation, via at least one injection well; and then injecting a fluid comprising an aqueous medium, the anionic surfactant and optionally an anionic cosurfactant; and then recovering a fluid conveying the oil leaving the underground formation by at least one production means;

wherein the compound of formula (I) is below:

$$R\text{—}O\text{-}(A)_m\text{-}H \qquad (I)$$

wherein:
R is a hydrocarbon-based group comprising from 6 to 40 carbon atoms,
A is a hexose or pentose unit,
m is a non-zero integer or fraction ranging from 1 to 10.

2. The process according to claim 1, wherein R is a hydrocarbon-based group comprising from 8 to 24 carbon atoms.

3. The process according to claim 1, wherein the compound of formula (I) has a hydrophilic-lipophilic balance of less than 14.

4. The process according to claim 1, wherein the anionic surfactant is:
an anionic agent of sulfonate, an anionic agent of sulfate, or combinations thereof; or
a mixture of anionic surfactants comprising one or more anionic agents of sulfonate, sulfate, or combinations thereof.

5. The process according to claim 4, wherein the anionic surfactant is a mixture of anionic surfactants comprising one or more anionic agents of sulfonate, sulfate, or combinations thereof, wherein the mixture does not comprise nonionic surfactants.

6. The process according to claim 1, wherein the anionic surfactant is a surfactant of carboxylate, phosphate, phosphonate, or combinations thereof; or a zwitterionic surfactant.

7. The process according to claim 1, wherein the compound of formula (I) is combined with at least one viscosity-enhancing polymer.

8. The process according to claim 7, wherein the at least one viscosity-enhancing polymer is a partially-hydrolyzed polyacrylamide.

9. The process according to claim 1, wherein R is a linear or branched alkyl or alkenyl group.

10. The process according to claim 9, wherein R comprises from 6 to 18 carbon atoms.

11. The process according to claim 10, wherein R comprises from 10 to 16 carbon atoms.

12. The process according to claim 9, wherein R is a linear or branched alkyl group.

13. The process according to claim 1, in which the underground formation is a carbonate-based or argillaceous rock.

* * * * *